(12) United States Patent
Lai et al.

(10) Patent No.: US 7,664,489 B2
(45) Date of Patent: Feb. 16, 2010

(54) METHOD FOR COMMUNICATION BETWEEN CELLULAR PHONES

(75) Inventors: Chengshing Lai, Taipei (TW); Shilong Yang, Nanking (CN)

(73) Assignee: Inventec Appliances Corp., Taipei (TW)

( * ) Notice: Subject to any disclaimer, the term of this patent is extended or adjusted under 35 U.S.C. 154(b) by 459 days.

(21) Appl. No.: 11/343,469

(22) Filed: Jan. 30, 2006

(65) Prior Publication Data

US 2006/0172728 A1 Aug. 3, 2006

(30) Foreign Application Priority Data

Jan. 31, 2005 (TW) .............................. 94102940 A

(51) Int. Cl.
*H04M 3/42* (2006.01)
*H04B 7/00* (2006.01)
(52) U.S. Cl. ...................................... 455/416; 455/518
(58) Field of Classification Search ................. 455/416, 455/406, 411, 431, 462, 436, 440, 552.1, 455/422.1, 432.1, 434, 435.2, 450, 509, 515, 455/421, 517, 518, 521, 74.1, 75; 370/338, 370/349
See application file for complete search history.

(56) References Cited

U.S. PATENT DOCUMENTS

| | | | |
|---|---|---|---|
| 6,205,338 B1 * | 3/2001 | Kim | 455/462 |
| 6,393,275 B1 * | 5/2002 | Alfred | 455/422.1 |
| 6,453,172 B1 * | 9/2002 | Miyashita | 455/552.1 |
| 2003/0108016 A1 * | 6/2003 | Bonta | 370/338 |
| 2005/0009574 A1 | 1/2005 | Lin | |

FOREIGN PATENT DOCUMENTS

| | | |
|---|---|---|
| JP | 2002171336 A | 6/2002 |
| JP | 2002368888 A | 12/2002 |
| TW | 361017 A | 6/1996 |
| TW | 390556 A | 5/2000 |

* cited by examiner

*Primary Examiner*—Melody Mehrpour
(74) *Attorney, Agent, or Firm*—Gottlieb, Rackman & Reisman, P.C.

(57) ABSTRACT

A method for a communication between two cellular phones is provided, in which the communication between the cellular phones includes an intercom communication and a telephone communication. The method includes steps of providing a telephone number of one cellular phone and an intercom number associated with the telephone number in the other cellular phone, dialing the telephone number of the one cellular phone by the other cellular phone to activate a calling to the intercom number associated with the telephone number, determining whether the cellular phones are within an intercom communication area, and performing the intercom communication therebetween while the cellular phones are within an intercom communication area, or performing the telephone communication therebetween while the cellular phones are without an intercom communication area.

19 Claims, 2 Drawing Sheets

METHOD FOR COMMUNICATION BETWEEN CELLULAR PHONES

FIELD OF THE INVENTION

Figure 1:
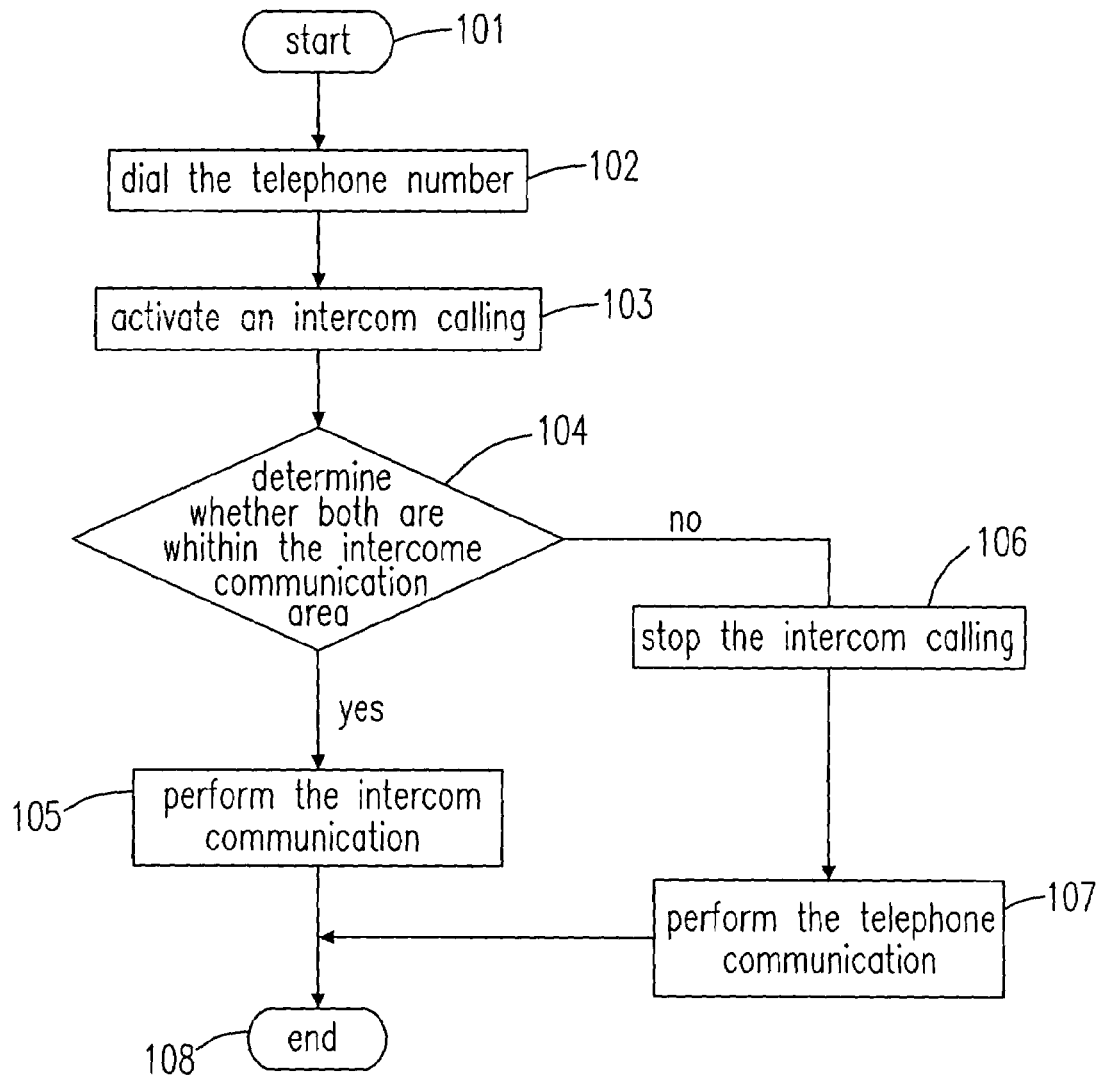

The present invention is related to a method for a communication between cellular phones, and more particularly to a method for a communication between two cellular phones to perform a telephone communication or an intercom communication therebetween during a short-distance calling.

BACKGROUND OF THE INVENTION

Nowadays, cellular phones have become handy necessaries for people and they often communicate with each other by using the cellular phones. As we know, a fee for a communication with cellular phones is very expensive. However, the cellular phones still are necessary for most people in the world because of their mobility and convenience.

Up to now, there are two main digital mobile communication systems in Taiwan, such as a global system for mobile communications (GSM) and a personal handy-phone system (PHS). The GSM includes a wider signal covering range and a better receiving ability, but the PHS includes a lower power and a lower rate.

Moreover, the PHS further includes a function for an intercom communication between two cellular phones. This function is similar to a wireless intercom function in a walkie-talkie. The intercom communication is directly communicated with each other within a specific intercom area and without any fee therefor. However, most people usually dial the cellular phone numbers for the other even though they are so close, and the free communication resource such as the intercom communication is obviously neglected or forgot. Therefore, it would be quite difficult to decrease the fee for the communication.

Therefore, the purpose of the present invention is to develop a method for a communication between cellular phones to deal with the above situations encountered in the prior art.

SUMMARY OF THE INVENTION

It is therefore a first aspect of the present invention to provide a method for a communication between two cellular phones for use in the mobile communication system including an existing intercom communication, in which one cellular phone could initiate an intercom calling in advance by dialing a telephone number of the other cellular phone to perform the intercom communication within an intercom communication area.

It is therefore a second aspect of the present invention to provide a method for a communication between two cellular phones including an automatic detecting function during a telephone communication between two cellular phones to periodically determine whether the cellular phones are within an intercom communication area, thereby selecting the telephone communication or an intercom communication so as to fully utilize a convenient wireless intercom function in the PHS and effectively decrease the fee for the communication.

According to an aspect of the present invention, a method for a communication between a first cellular phone and a second cellular phone is provided, in which the communication between the first cellular phone and the second cellular phone comprises an intercom communication and a telephone communication. The method includes steps of (a) providing a telephone number of the second cellular phone and an intercom number associated with the telephone number in the first cellular phone, (b) dialing the telephone number of the second cellular phone by the first cellular phone to activate a calling to the intercom number associated with the telephone number, (c) determining whether the first cellular phone and the second cellular phone are within an intercom communication area, and (d) performing the intercom communication between the first cellular phone and the second cellular phone while the first cellular phone and the second cellular phone are within the intercom communication area, or performing the telephone communication between the first cellular phone and the second cellular phone while the first cellular phone and the second cellular phone are without the intercom communication area.

Preferably, the method further includes a step of (d0) stopping the calling to the intercom number before performing the telephone communication in the step (d).

Preferably, the first and second cellular phones are personal handy-phone system (PHS) mobile phones.

Preferably, the intercom communication area is in a range of 200 meters.

Preferably, the intercom number is configured to the second cellular phone.

Preferably, the intercom communication is a wireless intercom communication, and the wireless intercom communication between the first and second cellular phones is achieved by an intercom protocol.

Preferably, the step of (c) is achieved by respectively detecting a first base station identification code used in the first cellular phone and a second base station identification code used in the second cellular phone.

Preferably, the method further includes a step of (e) periodically determining whether the first cellular phone and the second cellular phone are within the intercom communication area after performing the telephone communication between the first cellular phone and the second cellular phone, and showing a querying message for selecting the telephone communication or the intercom communication if the first cellular phone and the second cellular phone are within the intercom communication area.

Preferably, the method further includes following steps of (f) breaking the telephone communication while the intercom communication is selected, and (g) calling the intercom number associated with the telephone number to perform the intercom communication.

Preferably, the method further includes a step of (h) continuing the telephone communication while the telephone communication is selected after the step (e).

Preferably, the first and second base station identification codes are respectively generated from base stations belonging to the first and second cellular phones.

Preferably, the base stations are microcell base stations.

According to another aspect of the present invention, a method for a communication between a first cellular phone and a second cellular phone is provided. The method includes steps of (a) dialing a telephone number from the first cellular phone to perform a telephone communication with the second cellular phone, (b) respectively detecting a first base station identification code used in the first cellular phone and a second base station identification code in the second cellular phone, and (c) selecting the telephone communication or an intercom communication between the first cellular phone and the second cellular phone to perform the communication while the first base station identification code and the second base station identification code are identical.

Preferably, the method further includes a step of (d) providing an intercom number associated with the telephone number.

Preferably, the method further includes following steps of (e) breaking the telephone communication while the intercom communication is selected, and (f) calling the intercom number associated with the telephone number to perform the intercom communication.

Preferably, the method further includes a step of (g) continuing the telephone communication while the telephone communication is selected.

The above contents and advantages of the present invention will become more readily apparent to those ordinarily skilled in the art after reviewing the following detailed descriptions and accompanying drawings, in which:

BRIEF DESCIPTION OF THE DRAWINGS

Figure 2:
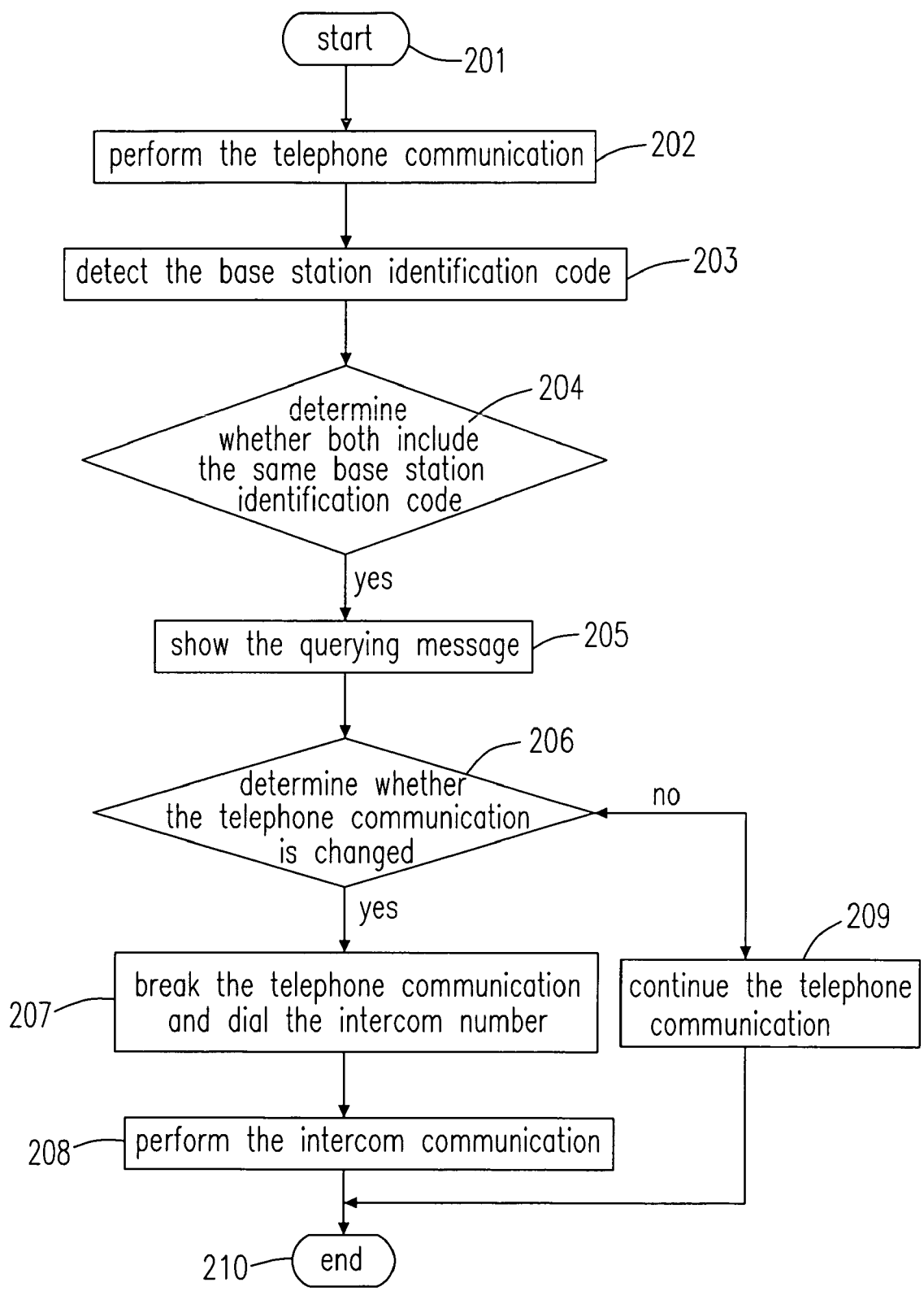

FIG. 1 is a flow chart showing a method for a communication between cellular phones according to a first preferred embodiment of the present invention; and FIG. 2 is a flow chart showing a method for a communication between cellular phones according to a second preferred embodiment of the present invention.

DETAILED DESCRIPTION OF THE PREFERRED EMBODIMENTS

The present invention will now be described more specifically with reference to the following embodiment. It is to be noted that the following descriptions of preferred embodiment of this invention are presented herein for purposes of illustration and description only; it is not intended to be exhaustive or to be limited to the precise form disclosed.

The present invention would be applied in a mobile communication system for a communication between cellular phones, in which the communication between the cellular phones includes an intercom communication and a telephone communication, and the intercom communication between the cellular phones would be within an intercom communication area. Further, one cellular phone include a telephone directory to provide telephone numbers to be associated with intercom numbers of the other cellular phones, and thus one of a telephone communication and the intercom communication between the cellular phones within the intercom communication area would be easily selected. To simplify the illustration of the present invention, there are only two cellular phones, i.e. a first cellular phone and a second cellular phone, mentioned in the following description. However, the present invention would be applied to more than two cellular phones according to actual needs.

Please refer to FIG. 1, which is a flow chart showing a method for a communication between cellular phones according to a first preferred embodiment of the present invention. Firstly, the present method for the communication between a first cellular phone and a second cellular phone would be executed (step 101), and the communication between the first cellular phone and the second cellular phone includes an intercom communication and a telephone communication. In addition, the first cellular phone includes a telephone directory, and the telephone directory has a telephone number of the second cellular phone and an intercom number, in which the intercom number is associated with the telephone number. Further, a user can dial the telephone number of the second cellular phone by the first cellular phone (step 102) to activate an intercom calling to the intercom number associated with the telephone number (step 103).

Then, there are two possible results (steps 105 and 106) according as whether the first cellular phone and the second cellular phone are within or without the intercom communication area (step 104). When the first cellular phone and the second cellular phone are within the intercom communication area, the intercom calling would be connected and the intercom communication between the first cellular phone and the second cellular phone would be executed (step 105). Alternatively, the intercom calling to the intercom number would be stopped (step 106) and the telephone number is redialed to perform the telephone communication (step 107) while the first cellular phone and the second cellular phone are out of the intercom communication area. Finally, the intercom communication (step 105) and the telephone communication (step 107) would be ended (step 108).

Furthermore, the first and second cellular phones are both personal handy-phone system (PHS) mobile phones, so that the first and second cellular phones both include the wireless intercom communication function. Further, the intercom number is configured to the second cellular phone and the intercom communication area is in a range of 200 meters. Besides, the intercom communication is a wireless intercom communication and the wireless intercom communication between the first and second cellular phones is achieved by an intercom protocol. Moreover, the present invention could be achieved by other mobile communication systems including the wireless intercom communication function.

Please refer to FIG. 2, which is a flow chart showing a method for a communication between two cellular phones according to a second preferred embodiment of the present invention. The present method for the communication between a first cellular phone and a second cellular phone would be started (step 201). Firstly, a user could dial a telephone number from the first cellular phone to perform a telephone communication with the second cellular phone (step 202). Further, a first base station identification code used in the first cellular phone and a second base station identification code used in the second cellular phone would be detected, respectively (step 203). This detecting process (step 202) would be performed by the telephone communication, and the first and second base station identification codes are respectively generated from base stations belonging to the first and second cellular phones. Moreover, the detecting result for whether the first base station identification code and the second base station identification code are identical, i.e. the first and second cellular phones include the same base station identification code, would be determined (step 204). Then, a querying message would be shown in the first cellular phone (step 205) when the first base station identification code and the second base station identification code are identical. The querying message can indicate the user to select the telephone communication or an intercom communication (step 206). There are two possible results. If the user selects the intercom communication, the telephone communication would be broken and an intercom number associated with the telephone number would be dialed (step 207) to perform the intercom communication (step 208). Alternatively, the telephone communication can be continued if the user selects the telephone communication. Finally, the intercom communication (step 208) and the telephone communication (step 209) would be ended (step 210).

Furthermore, the base stations are microcell base stations of the PHS, and the signal covering range in the microcell base station is within a radius of several meters. Therefore, if the first and second cellular phones are detected to have the same base station identification code in the step 204, i.e. use the same base station, the distance between the first and second cellular phones should be quite close, and the first cellular phone and the second cellular phone could be within an intercom communication area. Thus, the querying message for selecting the telephone communication or the intercom communication would be shown, i.e. the step 205 and the intercom communication between the first cellular phone and the second cellular phone could be performed. In addition, the detecting process in the step 203 and the determining process in the step 204 can be periodically performed at every one or five minutes.

Moreover, the first preferred embodiment and the second preferred embodiment can be combined. Take a simple example, when the first cellular phone and the second cellular phone are without the intercom communication area, the telephone communication between the first cellular phone and the second cellular phone would be performed, such as the step 107 in FIG. 1. Then, it is possible that the first cellular phone and the second cellular phone can be moved to be within the intercom communication area during the telephone communication. Thus, the step 107 in FIG. 1 could be regarded as the step 202 in FIG. 2. Thus, the subsequent processes in FIG. 2, such as the step 203 and the step 204, can be proceeded continually after the step 107 is performed. In addition, the user of the first cellular phone could easily obtain the querying message for showing whether the first cellular phone and the second cellular phone are within the intercom communication area and select the telephone communication or the intercom communication.

According to the above description, the present method could provide a convenient communication process to select one of an expensive telephone communication and a free intercom communication between two cellular phones by the user within a specific communication area without any additional operation. Further, the intercom communication and the telephone communication could be easily changed or selected by detecting the base station identification codes within two cellular phones in time to periodically determine whether two cellular phones are within the intercom communication area, even though during the telephone communication therebetween. Thus, the user could effectively use the existing intercom function in the mobile communication system.

In conclusion, it is understood that the present method for the communication between cellular phones could be achieved by providing the intercom number associated with the telephone number and initiating an intercom calling in relation to the intercom number beforehand while dialing the telephone number to change the conventional independent dialing process for the telephone communication and the intercom communication. Furthermore, the present method includes an automatic detecting process during the telephone communication to determine whether the cellular phone could perform the intercom communication. Therefore, the existing intercom communication would be fully utilized and the fee for the communication within a short distance would be effectively decreased.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for a communication between a first cellular phone and a second cellular phone, wherein said communication between said first cellular phone and said second cellular phone comprises an intercom communication and a telephone communication, comprising steps of:
   (a) providing a telephone number of said second cellular phone and an intercom number associated with said telephone number to said first cellular phone, which has a telephone number different from said telephone number of said second cellular phone;
   (b) dialing said telephone number of said second cellular phone by said first cellular phone to activate a calling to said intercom number associated with said telephone number of said second cellular phone;
   (c) determining whether said first cellular phone and said second cellular phone are within an intercom communication area;
   (d) performing said intercom communication between said first cellular phone and said second cellular phone while said first cellular phone and said second cellular phone are within said intercom communication area, or performing said telephone communication between said first cellular phone and said second cellular phone while said first cellular phone and said second cellular phone are without said intercom communication area; and
   (e) automatically and periodically determining whether said first cellular phone and said second cellular phone are within said intercom communication area after performing said telephone communication between said first cellular phone and said second cellular phone.

2. The method according to claim 1 further comprising a step of (d0) stopping said calling to said intercom number before performing said telephone communication in said step (d).

3. The method according to claim 1, wherein said first and second cellular phones are personal handy-phone system (PHS) mobile phones.

4. The method according to claim 1, wherein said intercom communication area is in a range of 200 meters.

5. The method according to claim 1, wherein said intercom number is configured to said second cellular phone.

6. The method according to claim 1, wherein said intercom communication is a wireless intercom communication.

7. The method according to claim 6, wherein said wireless intercom communication between said first and second cellular phones is achieved by an intercom protocol.

8. The method according to claim 1, wherein the step of (c) is achieved by respectively detecting a first base station identification code used in said first cellular phone and a second base station identification code used in said second cellular phone.

9. The method according to claim 1 further comprising showing a querying message for selecting said telephone communication or said intercom communication if said first cellular phone and said second cellular phone are within said intercom communication area.

10. The method according to claim 9 further comprising following steps after said step (e):
    (f) breaking said telephone communication while said intercom communication is selected; and
    (g) calling said intercom number associated with said telephone number of said second cellular phone to perform said intercom communication.

11. The method according to claim 9 further comprising a step of (h) continuing said telephone communication while said telephone communication is selected after said step (e).

12. The method according to claim 8, wherein said first and second base station identification codes are respectively generated from base stations belonging to said first and second cellular phones.

13. The method according to claim 8, wherein said base stations are microcell base stations.

14. A method for a communication between a first cellular phone and a second cellular phone, comprising steps of:
- (a) dialing a telephone number of said second cellular phone from said first cellular phone to perform a telephone communication with said second cellular phone, wherein said first cellular phone has a telephone number different from said telephone number of said second cellular phone;
- (b) respectively detecting a first base station identification code used in said first cellular phone and a second base station identification code in said second cellular phone; and
- (c) selecting said telephone communication or an intercom communication between said first cellular phone and said second cellular phone to perform said communication while said first base station identification code and said second base station identification code are identical.

15. The method according to claim 14 further comprising a step of (d) providing an intercom number associated with said telephone number of said second cellular phone.

16. The method according to claim 15 further comprising following steps of:
- (e) breaking said telephone communication while said intercom communication is selected; and
- (f) calling said intercom number associated with said telephone number of said second cellular phone to perform said intercom communication.

17. The method according to claim 14 further comprising a step of (g) continuing said telephone communication while said telephone communication is selected.

18. The method according to claim 14, wherein said intercom number is configured to said second cellular phone.

19. The method according to claim 14, wherein said first and second cellular phones are personal handy-phone system (PHS) mobile phones.

\* \* \* \* \*